United States Patent
Schulze

(10) Patent No.: US 9,774,047 B2
(45) Date of Patent: Sep. 26, 2017

(54) METHOD AND APPARATUS FOR FORMING A MATRIX LINER FOR A PRESSURE VESSEL

(71) Applicant: GM Global Technology Operations LLC, Detroit, MI (US)

(72) Inventor: Joerg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 1010 days.

(21) Appl. No.: 13/850,576

(22) Filed: Mar. 26, 2013

(65) Prior Publication Data
US 2014/0295323 A1   Oct. 2, 2014

(51) Int. Cl.
| | | |
|---|---|---|
| H01M 8/04082 | (2016.01) | |
| F17C 1/16 | (2006.01) | |
| F17C 1/06 | (2006.01) | |
| B60K 15/03 | (2006.01) | |

(52) U.S. Cl.
CPC ... *H01M 8/04201* (2013.01); *B60K 15/03006* (2013.01); *F17C 1/06* (2013.01); *F17C 1/16* (2013.01); *B60K 2015/03032* (2013.01); *B60K 2015/03046* (2013.01); *B60K 2015/03315* (2013.01); *F17C 2203/0604* (2013.01); *Y02P 70/56* (2015.11)

(58) Field of Classification Search
CPC .............................................. F17C 2203/0604
See application file for complete search history.

(56) References Cited

U.S. PATENT DOCUMENTS

| | | | | |
|---|---|---|---|---|
| 2,744,043 | A * | 5/1956 | Ramberg | B29C 53/602 |
| | | | | 156/155 |
| 2,848,133 | A * | 8/1958 | Ramberg | B29C 53/602 |
| | | | | 138/DIG. 2 |
| 5,045,251 | A * | 9/1991 | Johnson | B29C 33/76 |
| | | | | 264/102 |
| 7,344,670 | B2 | 3/2008 | Schmidt | |
| 2002/0136942 | A1 * | 9/2002 | Kashiwagi | H01M 8/04089 |
| | | | | 429/415 |
| 2004/0173618 | A1 * | 9/2004 | Suzuki | F17C 1/16 |
| | | | | 220/581 |
| 2008/0093367 | A1 * | 4/2008 | Gilbertson | F17C 1/06 |
| | | | | 220/592 |
| 2011/0304083 | A1 | 12/2011 | Strack | |

FOREIGN PATENT DOCUMENTS

CN          101319338 A     12/2008

* cited by examiner

*Primary Examiner* — Maria J Laios
*Assistant Examiner* — Robert S. Carrico
(74) *Attorney, Agent, or Firm* — Quinn IP Law

(57) ABSTRACT

A pressure vessel for the storage of pressurized fluids for a fuel cell system, a liner for the pressurized vessel and a method of making. The method of manufacturing a pressure vessel includes forming a lost core assembly, a reinforcement structure around the assembly and removing the core from said assembly to define an internal compartment. The lost core assembly includes a first sacrificial material used to define the shape of the pressure vessel's internal compartment, boss attachable to the first material for the introduction and removal of the fluid into the pressure vessel, and a second material for placement around the first material and at least a portion of the boss such that upon removal of the first material, the second material defines the liner. The reinforcement structure is wound around the liner to give the pressure vessel a unitary, composite structure.

6 Claims, 8 Drawing Sheets

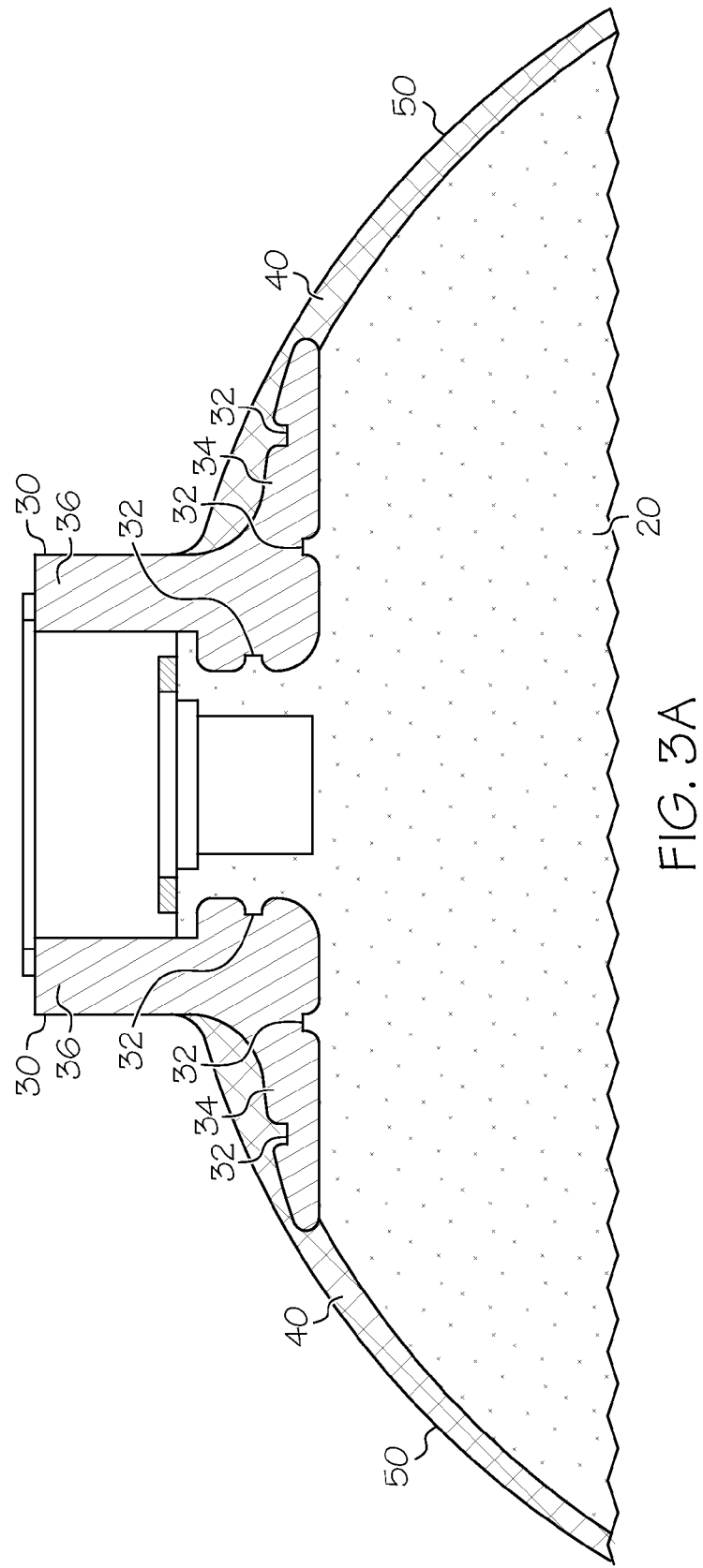

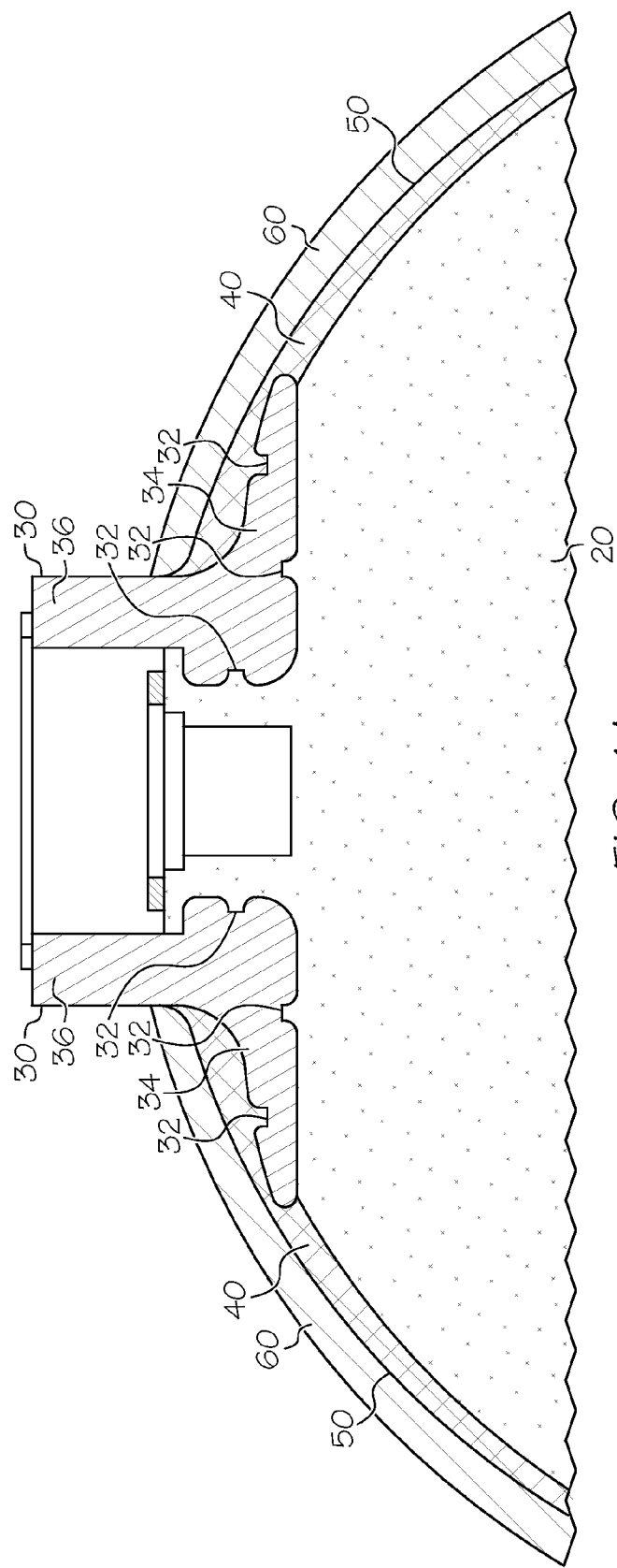

US 9,774,047 B2

METHOD AND APPARATUS FOR FORMING A MATRIX LINER FOR A PRESSURE VESSEL

FIELD OF THE INVENTION

The present disclosure relates generally to a method and apparatus for forming a pressure vessel for a fuel cell system, and more particularly to a liner for use in conjunction with a reinforcement structure for a pressure vessel having homogeneous characteristics.

BACKGROUND

A pressure vessel (also referred to herein as a storage tank, or more simply, a tank) for storing high pressure gaseous mediums (such as hydrogen, compressed natural gas, or air) typically includes one or more liners, at least one mouthpiece (typically in the form of a metal boss) and a filament wound outer shell reinforcement structure. The pressure vessel may be incorporated into a vehicle to supply fuel (for example, hydrogen) or an oxidant (such as oxygen) to a fuel cell stack capable of powering the vehicle.

The liner may be formed utilizing conventional methods such as rotational molding, blow molding, injection molding, or thermoforming with a plastic, typically from a thermoplastic, such as polyethylene, PET, polyoxymethylene (POM), ABS/PC, ethylene vinyl alcohol, or a nylon material, for example, by disposing penetrating elements in a die cavity with a polymer resin, heating the mold while being rotated to cause the polymer resin to melt and coat walls of the die cavity, cooling the die, and removing the molded liner.

The metal boss is typically configured with one of threads or other coupling means to accept a valve, sensor, coupler, conduit or other device used to provide a coupling point for the pressure vessel. The gaseous medium passes through the boss when one of entering and exiting the pressure vessel.

The wound outer shell—which normally provides the bulk of the support or reinforcement structure for the pressure vessel—is typically formed by a filament winding process, and is connected to the liner and cured in an autoclave.

Currently, the materials and known methods used to form the pressure vessel provide poor durability effects. For example, the liner generally cannot withstand stress forces such that the tank is exposed to over its operational life, such as those associated with being subjected to numerous filling and emptying cycles, as well as temperature extremes. Thus, in one form, a minimum pressure should be maintained in the tank at all times to ensure that the liner is firmly supported by the reinforcement structure. At pressures below the minimum pressure—for example less than about 20 bar—the liner and reinforcement structure may separate from each other causing a "loose" liner effect. If the pressurized fluid is introduced into the pressure vessel quickly under high pressure while the pressure within the tank is below the proscribed minimum, the liner will bump against the reinforcement structure very hard causing a "buckled" liner. The liner could rupture, allowing the contents to flow through the outer layer into the environment. In addition, pressurized fluid trapped in the gap between the liner and reinforcement structure can damage one or both of the liner and reinforcement structure. Significant temperature changes may produce the same deleterious effects.

SUMMARY

Against the above background, the present disclosure is directed to a method and apparatus for forming a liner for a pressure vessel in a fuel cell system comprising a homogeneous matrix formed using a lost core assembly to improve durability effects such as a loose or buckled liner and avoid difficulties in time and temperature fills such that when the pressure vessel is emptied to ambient pressure the pressure vessel is not harmed. Significantly, the liner and reinforcement structure manufactured in accordance with the disclosure herein possesses structurally homogeneous characteristics that reduces or avoids durability effects such as a loose or buckled liner mentioned above that occur when the pressure vessel is emptied to a low (for example, ambient), as well as avoid difficulties in time and temperature fills. One manifestation of the homogeneous nature of the pressure vessel is the substantially complete binding of the fiber-based reinforcement structure to the resin that makes up the liner. In addition to improving the durability of such pressure vessels, the approach of the present disclosure will allow improved vehicle range or size and weight advantages for automotive manufacturers.

In one embodiment, a method of manufacturing a pressure vessel for a fuel cell system includes forming a lost core assembly with a first material having a generally axisymmetric shape, connecting one or more bosses to a core of the assembly, immersing the core into a second material, solidifying the second material, forming a reinforcement structure around at least a portion of the boss and liner such that an internal compartment formed in the pressure vessel upon removal of the core from the lost core assembly is capable of withstanding up to at least about 30 bar (or more) of pressure caused by the pressurized fuel cell system reactant that is subsequently placed therein.

In another embodiment, a method of manufacturing a fuel cell system includes assembling a storage vessel, providing at least one fuel cell stack and fluidly connecting the vessel to the stack through a conduit. In this way, once a fuel cell reactant is placed in the vessel, selective fluid communication of the reactant contained within the vessel with the stack is established. The vessel is assembled by forming a lost core assembly with a first material, a second material and one or more bosses. The first material defines the core, while one or more bosses are connected to preferred locations on the core. The core is immersed into the second material such that upon solidification of the second material and subsequent removal of the core from the assembly, the internal space or compartment formed within the second material defines a liner for containment of a pressurized gas for use in the fuel cell system. A reinforcement structure is then formed around at least a portion of the boss and liner such that the liner and reinforcement structure define a substantially unitary structure such that loose liner problems are avoided. In one form, the vessel defines a composite structure where—in the present context—a composite structure is that made up of two or more discrete components that upon formation function as a unitary or single whole. In one particular example germane to the present invention, the formation of the reinforcement structure around the liner is such that they cooperate to remain in substantial unitary contact with one another, regardless of if the tank is in a fully pressurized state (such as when it contains hydrogen gas or some other related fuel cell system reactant) or in a relatively unpressurized state (such as when the tank is substantially depleted of reactant).

In yet a further embodiment, a liner for a fuel cell system pressure vessel prepared by a process is disclosed. The process steps include the steps of providing a sacrificial material in a shape corresponding to an internal compartment of the pressure vessel, attaching one or more bosses to the sacrificial material, placing a liner material around the sacrificial material and at least a portion of the boss (or bosses) and removing the sacrificial material. As discussed elsewhere in this disclosure, the sacrificial material forms a core that becomes lost (i.e., removed) in order to leave behind a liner of the desired shape. In optional forms, the sacrificial material comprises a foam and the liner material comprises a liquid that is curable into a solid form upon a subsequent hardening step. As also discussed elsewhere in this disclosure, the step of placing the liner material can be done through dip coating the sacrificial material into the liquid form of the second material and solidifying the second material as many times as necessary to achieve the desired final liner thickness. In addition, a reinforcement structure may be formed around the liner such that a pressure vessel formed thereby has enhanced load-bearing capability, including withstanding high (up to about 30 bars) pressures imparted to the walls of the liner by the pressurized fluid introduced therein.

These and other features, aspects and advantages of the present disclosure will become better understood with reference to the following description and the appended claims.

BRIEF DESCRIPTION OF THE DRAWINGS

Though the specification concludes with claims particularly pointing out and distinctly claiming the present disclosure, it is believed that the present disclosure will be better understood from the following description taken in conjunction with the accompanying drawings, in which:

FIG. 3A is a detail view of FIG. 3 further illustrating a boss region with integral parts thereon;

FIG. 4A is a detail view of FIG. 4 further illustrating a boss region with integral parts thereon;

DETAILED DESCRIPTION

Features and advantages of the disclosure will now be described with occasional reference to specific embodiments. However, the disclosure may be embodied in different forms and should not be construed as limited to the embodiments set forth herein. Rather, these embodiments are provided so that this disclosure will be thorough and complete and will fully convey the scope of the disclosure to those skilled in the art.

The pressurized fluid as described in the various embodiments herein may be any fluid such as gas such as hydrogen gas, compressed natural gas, and oxygen gas, a liquid, and both a liquid and a gas, for example. In a preferred embodiment, the pressure vessel described herein is configured as a storage tank for a pressurized reactant fuel.

Figure 1:
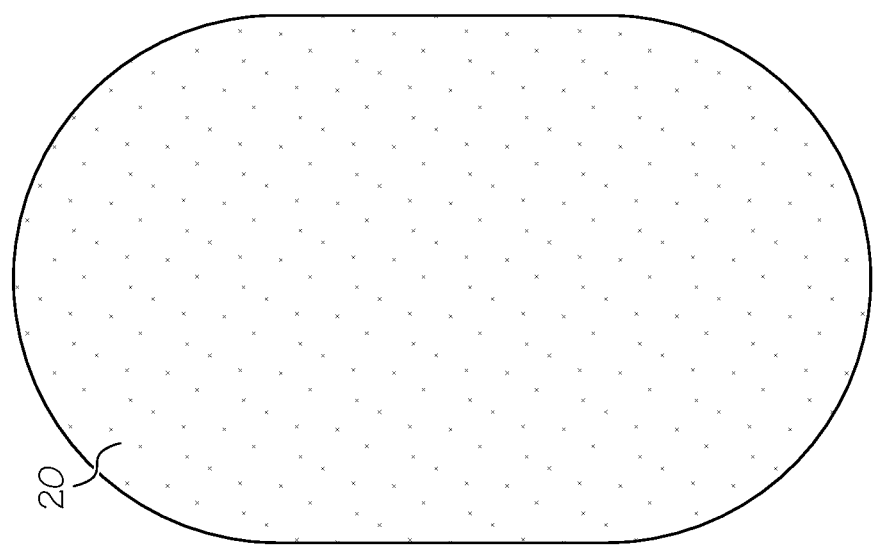
FIG. 1 is cross-sectional view of a core made from a sacrificial first material that is used in assembly of a pressure vessel according to an aspect of the present disclosure.

Referring first to FIG. 1, a cross-sectional view of a core 20 used in the making of a lost core assembly of the pressure vessel 10 is shown. The core 20 is formed with a first material comprising a foam material, for example, a polystyrene foam. In a preferred form, the foam material is selected to be sacrificial by either melting at a relatively low temperature (for example that used in a hot liquid bath) or dissolving in the presence of a suitable chemical (solubilization) agent. The core 20 has a generally axisymmetric shape that defines a desired inner cavity size and shape of the completed vessel 10; however the core 20 may have any shape, as desired. The formed core can be shaped by placement into a suitable mold (for example, a plastic injection mold, not shown) and molded over by a thermoplastic or thermoset material to form the desired liner shape.

Figure 2:
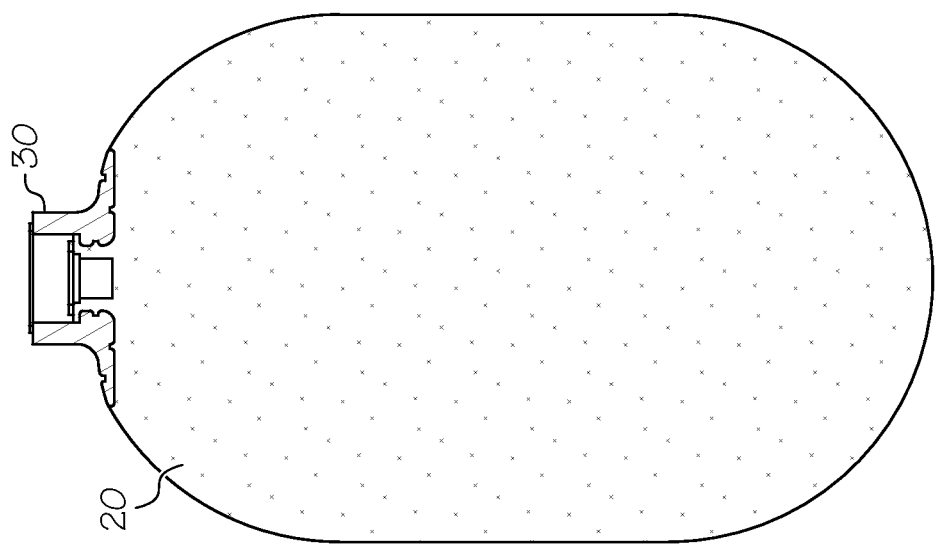
FIG. 2 is a cross-sectional view of a boss region connected to the core of FIG. 1.
Figure 2A:
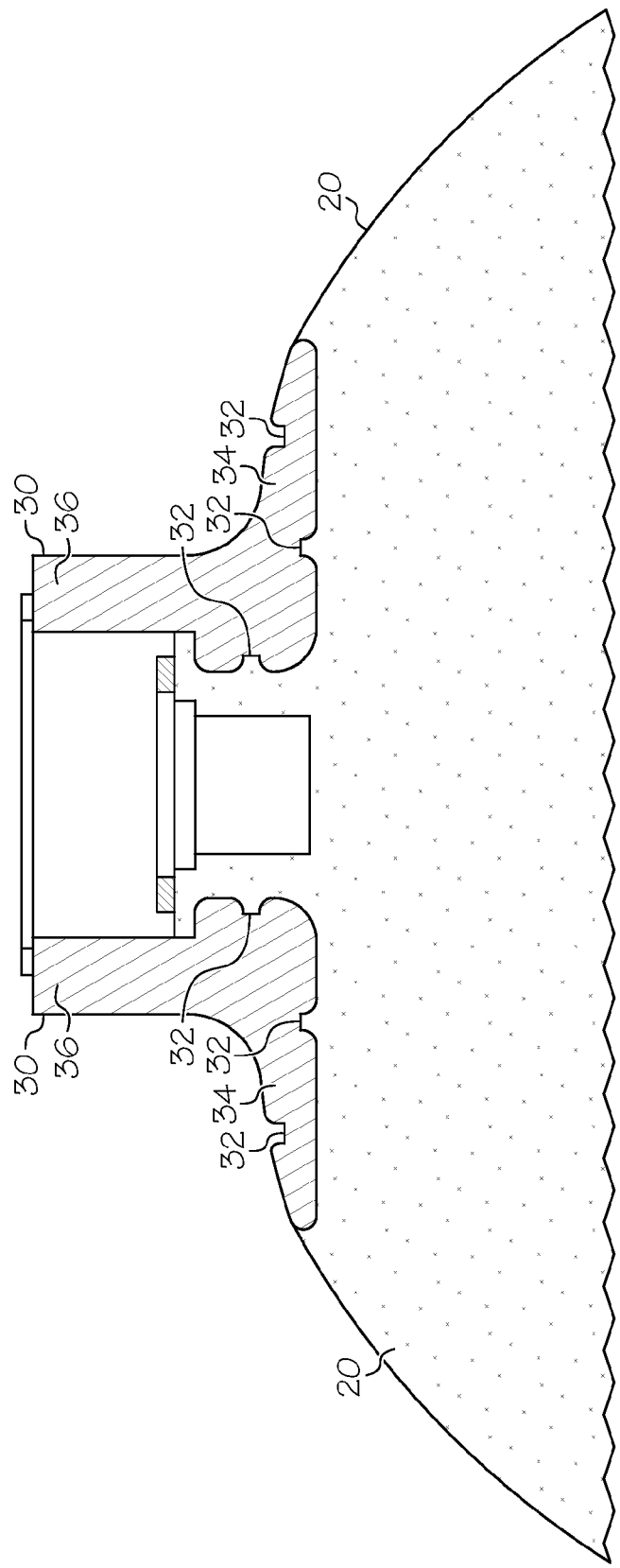
FIG. 2A is a detail view of FIG. 2 further illustrating the boss region with integral parts thereon.

FIG. 2 illustrates a cross-sectional view of a boss 30 connected to at least one end of the core 20 of FIG. 1, while FIG. 2A is a more detailed view of the boss region 30 connected to the core 20 showing the integral parts formed thereon. In addition to providing an aperture through which a fluid may be introduced into or removed from a subsequently-formed tank, the boss 30 includes indentations (or groove) 32, a shoulder portion 34 and a neck portion 36. The core 20 is connected to the shoulder portion 34 of the boss 30 such that the core 20 fills the plurality of indentations 32 located on the inside surface of the shoulder portion 34 of the boss 30. In addition to indentations 32, it is understood that the boss 30 may include grooves, channels, and/or protuberances adapted to receive a portion of a material to facilitate a higher degree of mechanical attachment of the material to the boss 30. The boss 30 may have any size and diameter suitable for coupling with fixation cores, threaded sleeves, nozzles, valves, gauges, tubes, a thermal-pressure relief device (TPRD) and similar fixtures which direct and control fluid into and out of pressurized fluid storage tanks. In some embodiments, additional sealing elements known in the art may be disposed between the boss 30 and the core 20 to militate against an unintended loss of the gaseous medium.

Figure 3:
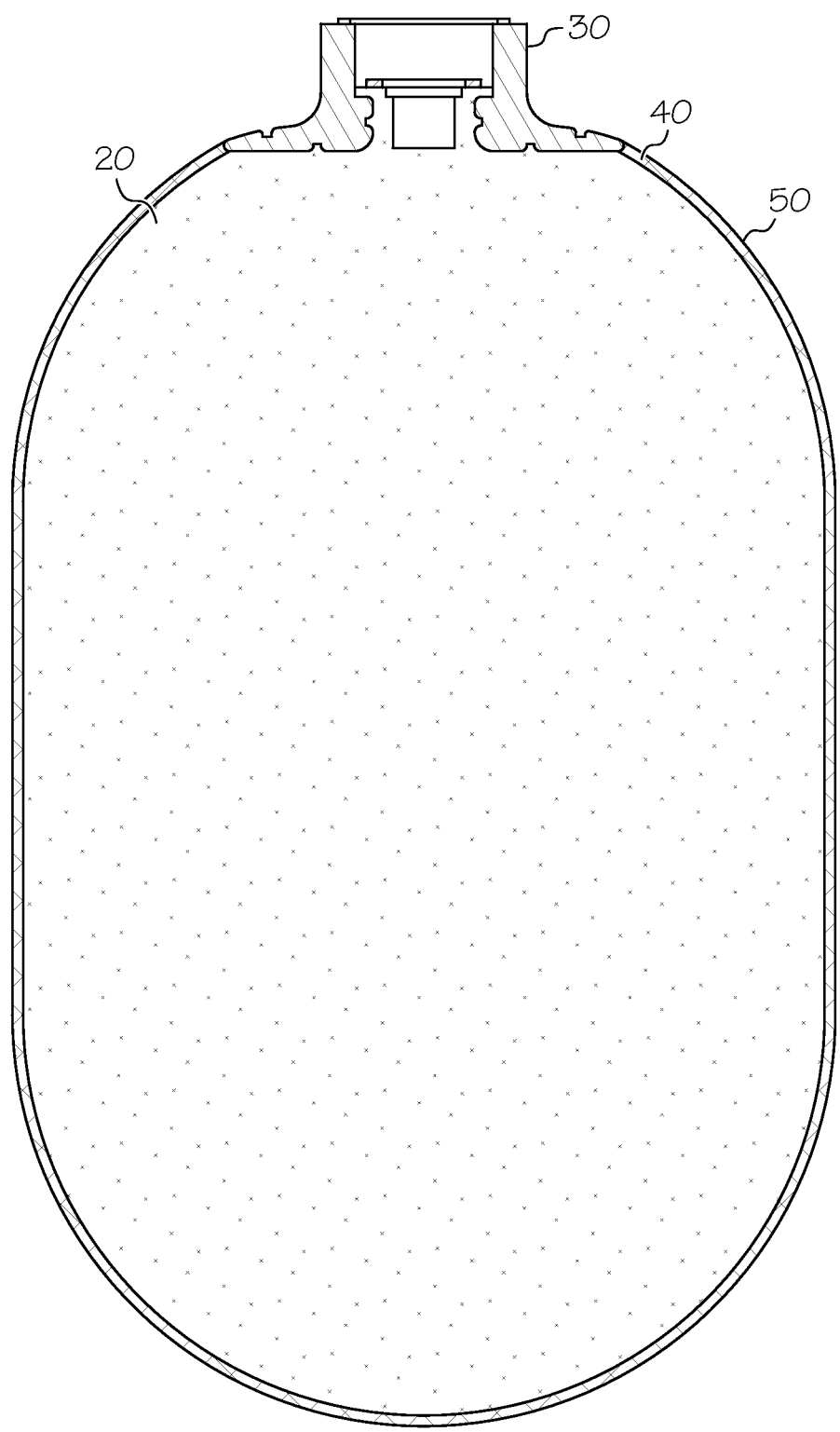
FIG. 3 is a cross-sectional view of a lost core assembly made up of the core and the boss region of FIG. 2 with a liner-forming second material.

FIG. 3 is a cross-sectional view of a second material 40 formed on the outer surface of the core assembly 20 and the boss region 30 of FIG. 2. FIG. 3A is a partial, cross-sectional view of FIG. 3 further illustrating a boss region 30 with integral parts thereon. The formed core 20 is immersed into a second material 40. In one form, the application of the second material 40 onto the core 20 is through dip coating. The second material 40—upon curing—will form a liner 50 using a resin, for example, a matrix resin or epoxy resin that can be the basis for a suitable plastic for the liner 50 that is created upon solidification or related curing of the second material 40. During such solidification process, the liner 50 made up of the second material 40 is formed on the outer edge of the shoulder portion 34 of the boss 30. The dip coating may be repeated a number of times depending on the desired final thickness of the liner 50. Thus, in one form, the liner 50 may be built up in a series of repeated steps. As can be seen in the figure, the liner 50 covers the boss region 30 over the groove 32 up to the beginning of the cylindrical part that defines the neck portion 36. In this way, additional gas tightness and mechanical strength in both directions for gas forces and mechanical loads is achieved. This is especially beneficial in disruptive impact events such as a vehicular crash or related misuse.

Figure 4:
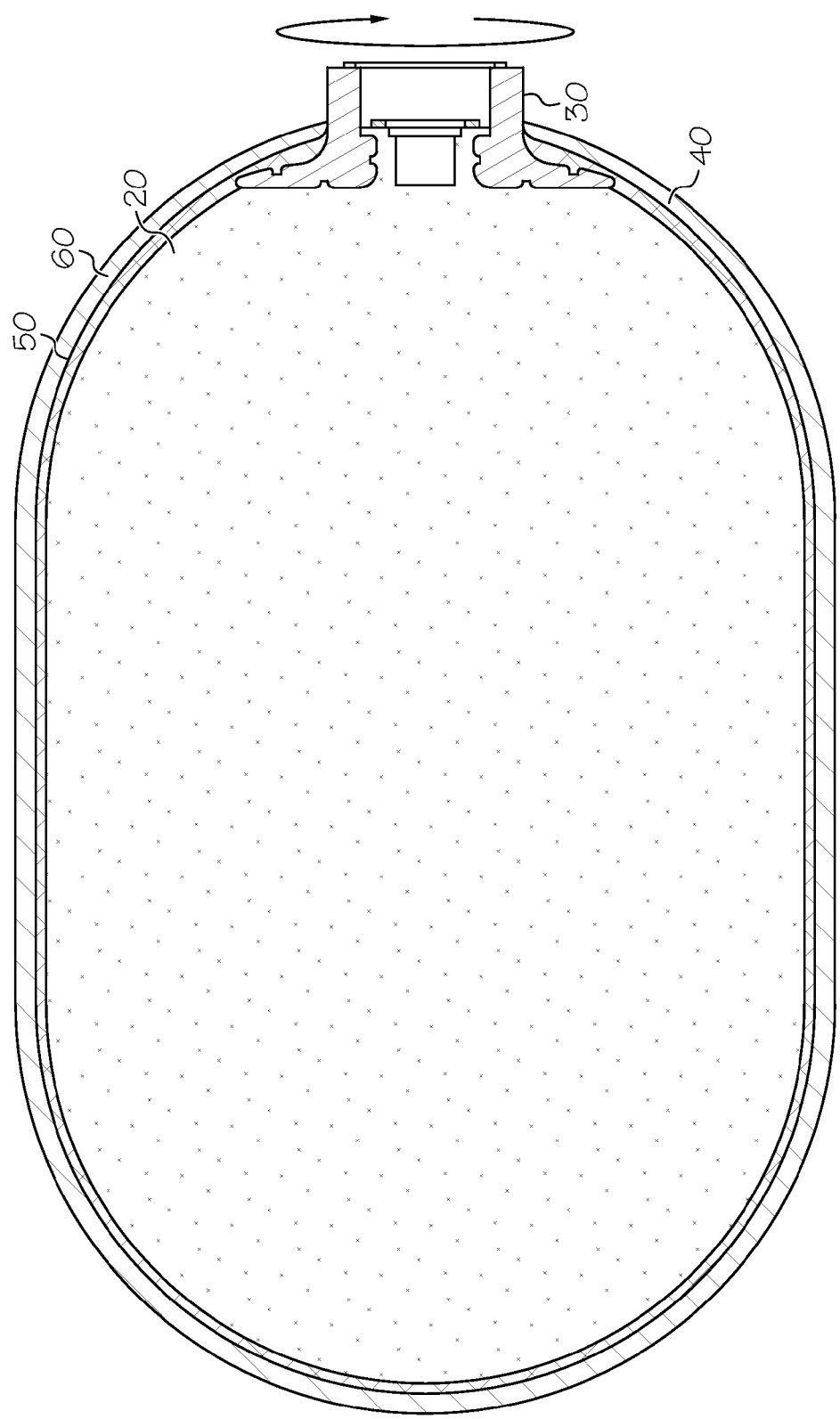
FIG. 4 is a cross-sectional view of a reinforcement structure formed around the lost core assembly and a portion of the boss region of FIG. 3.

FIG. 4 is a cross-sectional view of a reinforcement structure 60 formed around the lost core assembly that is made up of core 20, boss region 30 and liner 50, while FIG. 4A shows the boss region 30 in more detail. Although not presently shown, the aperture formed in boss 30 may include threads to permit the rotational connection (depicted by the counterclockwise-directed rotation shown above the aperture) to a fluid coupling line or other connecting device. As shown, the reinforcement structure 60 is affixed or otherwise secured to the liner 50 formed by the second material such that together they define a substantially unitary permanent structure between them. In this regard, the vessel 10 is made of a composite between the liner 50 and the reinforcement structure 60. In a particular form, the fibers of the reinforcement structure 60 may be wound around a wet liner 50 shell that has been built up through numerous repeated dippings as discussed above.

Figure 5:
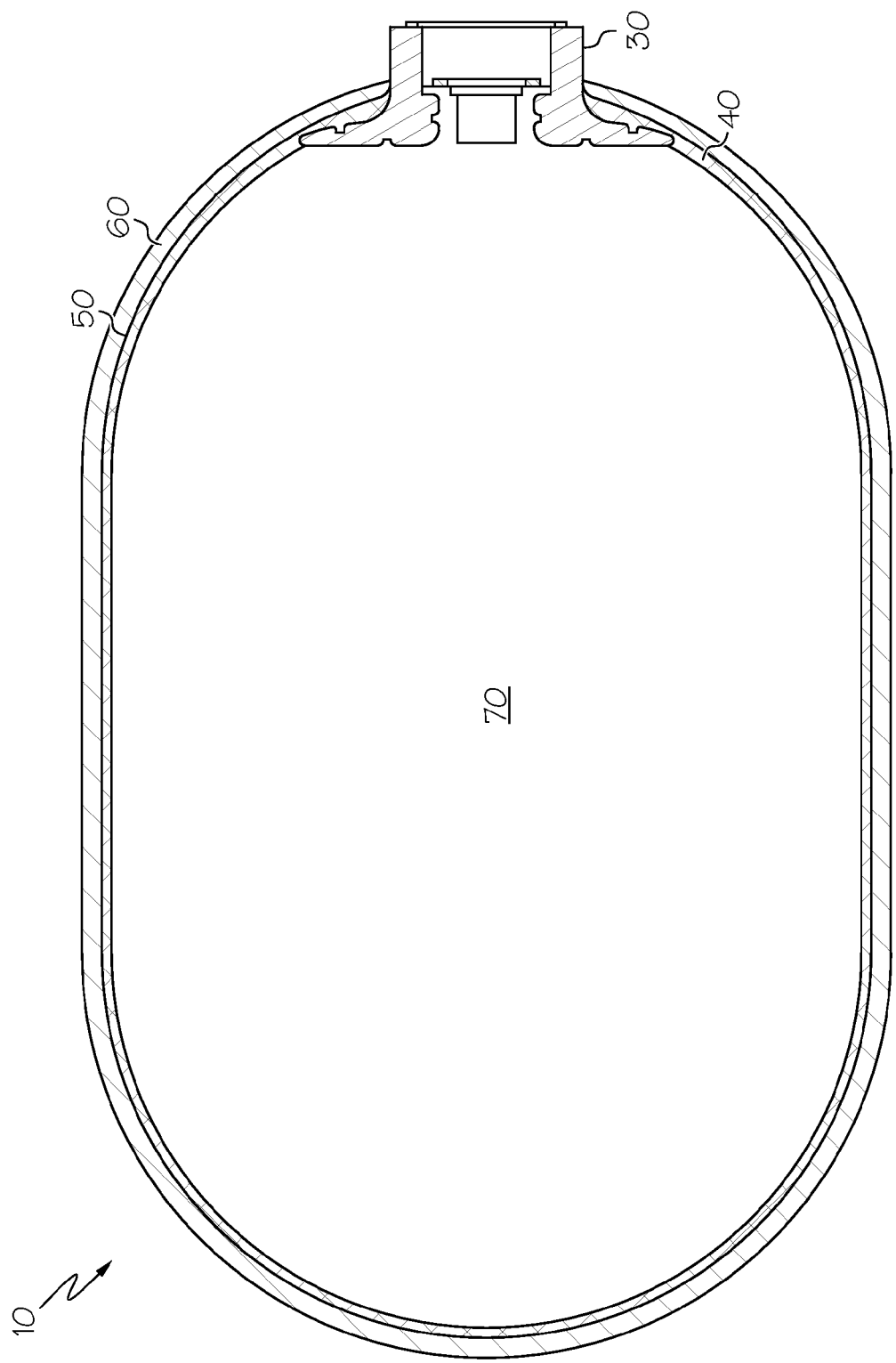
FIG. 5 is a cross-sectional view of the formed pressure vessel for a fuel cell system with the core removed.
Figure 5A:
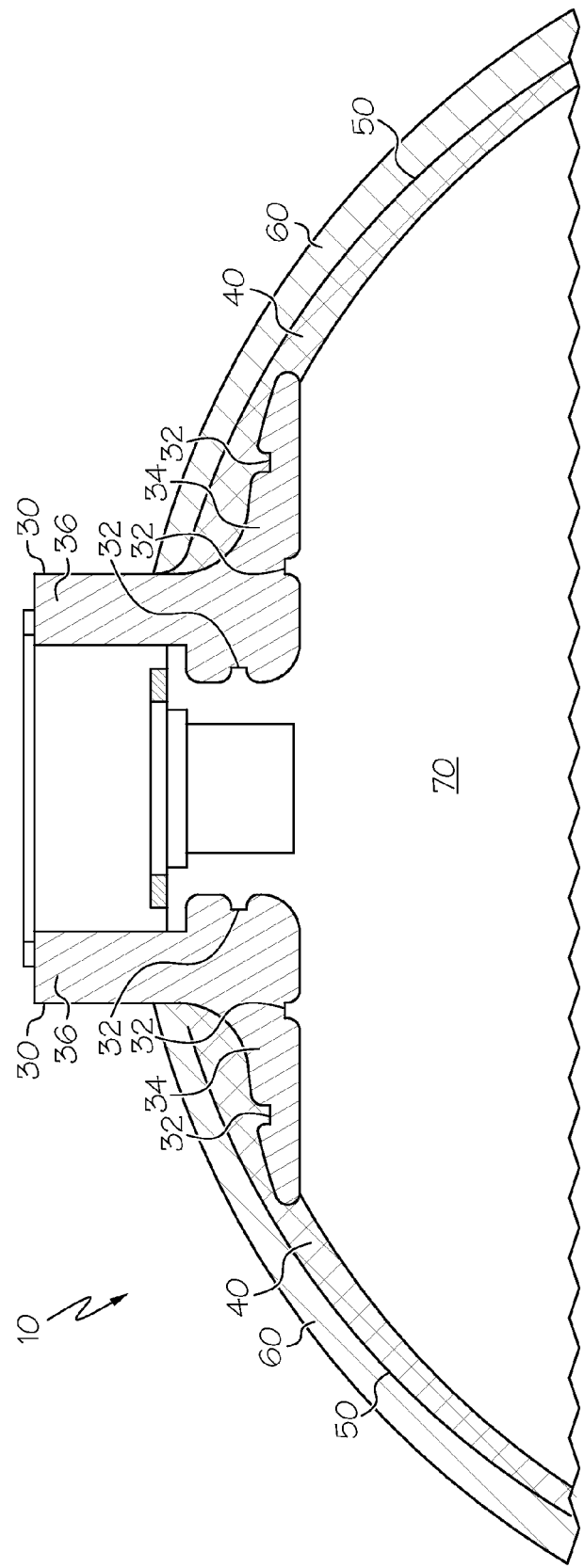
FIG. 5A is a detail view further of the formed pressure vessel of FIG. 5 with the boss region and integral parts thereon.

FIG. 5 is a cross-sectional view of FIG. 4 illustrating the formed pressure vessel 10 for a fuel cell system. Once the core 20 of the lost core assembly is removed, the remaining hollow space within the liner 50 and reinforcement structure 60 defines an internal compartment 70 for the storage of the pressurized hydrogen or other gas for use as a reactant for the fuel cell system in general and a proton exchange membrane (PEM)-based fuel system in particular. FIG. 5A is a more detailed view further illustrating the formed pressure vessel 10 of FIG. 5 with the boss region 30 and integral parts. The lengthwise dimension of pressure vessel 10—which generally coincides with the direction of fluid introduction and removal through the aperture formed in boss 30—defines a substantially longitudinal axis such that the shape of the internal compartment 70 is generally axisymmetric about such axis.

Although FIGS. 3 through 5A depict a fabrication approach where the foam core 20 is removed once the reinforcement structure 60 has been formed around the liner 50, it is also within the scope of the present invention to remove the foam core 20 prior to formation of the reinforcement structure 60, so long as the second material 40 that becomes the liner is stiff enough to be self-supporting at this interim stage. Likewise, the present method of manufacturing a pressure vessel for a fuel cell system may include additional steps or be part of a larger assembly scheme, including connecting the fabricated vessel to one or more other fuel cell system components such as a fuel cell stack, as well as the conduit, valves, sensors/monitoring equipment, controllers and optional pumping equipment.

It is noted that terms like "preferably", "commonly" and "typically" (and their variants) are not utilized herein to limit the scope of the claimed disclosure or to imply that certain features are critical, essential or even important to the structure or function of the claimed disclosure. Rather, these terms are merely intended to highlight alternative or additional features that may or may not be utilized in a particular embodiment of the present disclosure. Likewise, for the purposes of describing and defining the present disclosure, it is noted that the term "device" is utilized herein to represent a combination of components and individual components, regardless of whether the components are combined with other components.

For the purposes of describing and defining the present disclosure it is noted that the term "substantially" is used herein to represent the inherent degree of uncertainty that may be attributed to any quantitative comparison, value, measurement or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement or other representation referring to an arrangement of elements or features that—while in theory would be expected to exhibit exact correspondence or behavior—may in practice embody something slightly less than exact.

Unless otherwise defined, all technical and scientific terms used herein have the same meaning as commonly understood by one of ordinary skill in the art to which the disclosure belongs. The terminology used in the description herein is for describing particular embodiments only and is not intended to be limiting. As used in the specification and appended claims, the singular forms "a" "an" and "the" are intended to include the plural forms as well, unless the context clearly indicates otherwise.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A method of manufacturing a fuel cell system, the method comprising:
    assembling a pressure vessel having an internal compartment for containment of a fuel-cell reactant therein, wherein the assembling comprises:
        forming a core from a first material;
        connecting at least one boss to the core;
        immersing an exposed surface of the core in a second material, the second material coating at least the core;
        solidifying the second material such that the first material, the second material, and the at least one boss define a lost-core assembly;
        removing the core from the lost-core assembly to leave a vessel-shaped liner defining the internal compartment; and
        forming a reinforcement structure around the vessel-shaped liner and at least a portion of the at least one boss, the vessel-shaped liner and the reinforcement structure defining a substantially unitary structure;
    providing at least one fuel cell stack; and
    fluidly connecting the internal compartment of the pressure vessel to the at least one fuel cell stack through a conduit such that the fuel-cell reactant within the internal compartment can be selectively delivered to the fuel cell stack to thereby manufacture the fuel cell system.

2. The method of claim 1, wherein the assembling further comprises constructing the pressure vessel such that the pressure vessel has a substantially longitudinal axis and a generally axisymmetric shape about the substantially longitudinal axis.

3. The method of claim 1, wherein the first material comprises a foam and the second material comprises a curable resin.

4. The method of claim 3, wherein immersing comprises dip coating the core at least once.

5. The method of claim 1, wherein removing the core is by at least one of a melting process or a solubilization process.

6. The method of claim 1, wherein forming the reinforcement structure is subsequent to removing the core.

\* \* \* \* \*